(12) United States Patent
Barrick et al.

(10) Patent No.: US 10,445,478 B1
(45) Date of Patent: Oct. 15, 2019

(54) MULTI-USER ACCESS CONTROL FOR A SENSITIVE SYSTEM

(71) Applicant: The Government of the United States as represented by the Director, National Security Agency, Fort George G. Meade, MD (US)

(72) Inventors: Daniel M. Barrick, Eldersburg, MD (US); Raul Grajales, III, Pasadena, MD (US); Brian S. McGarvey, Arnold, MD (US); Mark S. Sitzwohl, Millersville, MD (US); William Paul F. Wright, Dayton, NJ (US)

(73) Assignee: Government of the United States, as represented by Director, National Security Agency, Washington, DC (US)

( * ) Notice: Subject to any disclaimer, the term of this patent is extended or adjusted under 35 U.S.C. 154(b) by 160 days.

(21) Appl. No.: 15/677,386

(22) Filed: Aug. 15, 2017

Related U.S. Application Data

(60) Provisional application No. 62/375,306, filed on Aug. 15, 2016.

(51) Int. Cl.
*G06F 21/00* (2013.01)
*G06F 21/31* (2013.01)
*G06F 1/26* (2006.01)
*G06F 13/42* (2006.01)
*G06F 1/3234* (2019.01)
*G06F 1/3218* (2019.01)

(52) U.S. Cl.
CPC .............. *G06F 21/31* (2013.01); *G06F 1/266* (2013.01); *G06F 1/3218* (2013.01); *G06F 1/3265* (2013.01); *G06F 13/4286* (2013.01)

(58) Field of Classification Search
CPC .................................. G06F 21/31; G06F 1/266
See application file for complete search history.

(56) References Cited

U.S. PATENT DOCUMENTS

2003/0112118 A1* 6/2003 Raslan ............... G07C 9/00142
340/5.2
2018/0293825 A1* 10/2018 Denton .............. G07C 9/00309

* cited by examiner

*Primary Examiner* — Tri M Tran

(57) ABSTRACT

A multi-user access control device provides controlled access to a sensitive system by enabling/disabling an input/output port in communication with said sensitive system. Tokens are held by users and provide for confirmation of group membership and authentication. Upon authentication of the users, an enable signal is provided to a relay providing power to an external port. The external port may provide power to an input/output device allowing the user to interact with the sensitive system. The external port may provide power to a network port of the access control device allowing for management of the access control device or allowing for auditing of the access control device.

14 Claims, 9 Drawing Sheets

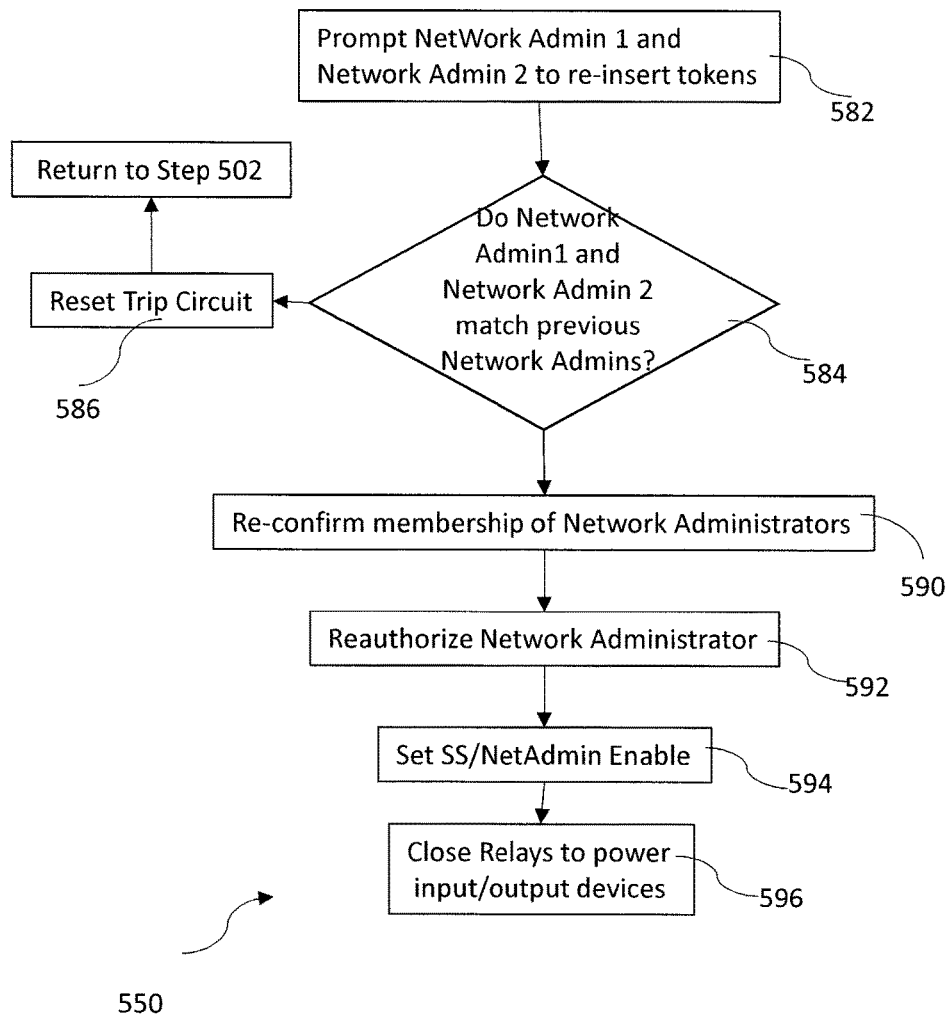
FIG. 4C – Cont.

MULTI-USER ACCESS CONTROL FOR A SENSITIVE SYSTEM

This application claims the domestic benefit of U.S. provisional patent application Ser. No. 62/375,306 filed Aug. 15, 2016, which disclosure is hereby incorporated by reference in its entirety.

FIELD OF THE INVENTION

This invention is generally directed to a device for providing access control by multiple user of a sensitive system.

BACKGROUND OF THE INVENTION

Currently, many high security environments require multiple-user control, typically two-person control (TPC). For example, a workstation containing sensitive information may require the presence of two authorized persons to gain access to the sensitive workstation. Although TPC can be incorporated in new system designs by requiring authentication of first and second users before access to the system is granted, many existing systems do not provide for the authentication of two users. Because modification to these systems to provide TPC is burdensome, a common approach to implementing TPC is to provide split passwords. In this approach, each pair of authorized users has an account username and password. Each person in the pair is provided with a portion of the username and a portion of the password. In order to access the sensitive workstation, each individual in the pair must enter a portion of the username and a portion of the password. This split password approach only enforces TPC at time of login. TPC is lost when one of the two authorized individuals walks away from the workstation and is no longer able to survey the workstation. To prevent the loss of TPC, therefore, policies are established requiring both of the authorized users to maintain surveillance and control of the sensitive workstation. Many operations provided on a sensitive workstation utilizing TPC require several hours to complete. Although no interaction with the system is required to keep the operations running, TPC policies require the operators continue surveillance of the sensitive workstation until the operation is complete to avoid interference with the sensitive process or tampering with the sensitive workstation by unauthorized users. Requirements which prevent a user(s) from walking away from the workstation lead to operational inefficiencies. For example, operations must be scheduled taking into account personnel schedules, such as breaks and shift changes.

Screen lock/unlock features, available on some sensitive systems, can prevent tampering allowing a user to walk away from the system while system processes continue. Thus screen lock/unlock features can provide greater flexibility to systems providing a split password approach to TPC. For example, the screen lock feature may be enabled before the user(s) walks away from the workstation. Upon return of the user(s), the user pair may re-enter the split username and password to regain access to the workstation. It is noted, however, that the unlock feature is only available to the original user pair which accessed the work station and implemented the screen lock feature. Thus, if the original pair of users is no longer available, in order to re-gain access to the workstation, the workstation may need to be restarted causing interruptions to any operations and processes occurring on the workstation.

Another drawback of the current split password TPC system is that these systems require significant system administrative burden. Each pair of operators is provided a unique password. Thus, each operator must be paired with all other operators and unique user names and passwords are assigned and split between each unique pair of users. For example, for six operators, the system administrator would need to create fifteen unique user names and passwords.

SUMMARY OF THE INVENTION

Briefly, the present invention discloses a multi-user access control device for controlling access to a sensitive system by multiple users. Controlled access is provided by limiting the functionality of input/output device(s) associated with the sensitive computer system. Access to the sensitive system requires a confirmation of group membership and authentication of the users using a security token. Upon confirmation of group members and authentication of the users, power is provided to the input/output device(s) allowing the authorized users to interact with the sensitive computer system. Once operation of the sensitive computer systems are initiated, operations may continue despite the removal of one of the security tokens. In addition, access to the sensitive system may be regained by authorized users including authorized users who did not initiate the processes on the computer system.

BRIEF DESCRIPTION OF THE DRAWINGS

The organization and manner of the structure and operation of the invention, together with objects and advantages thereof, may best be understood by reference to the following description, taken in connection with the accompanying drawings, wherein like reference numerals identify like elements in which.

DETAILED DESCRIPTION OF THE PREFERRED EMBODIMENT

Figure 1:
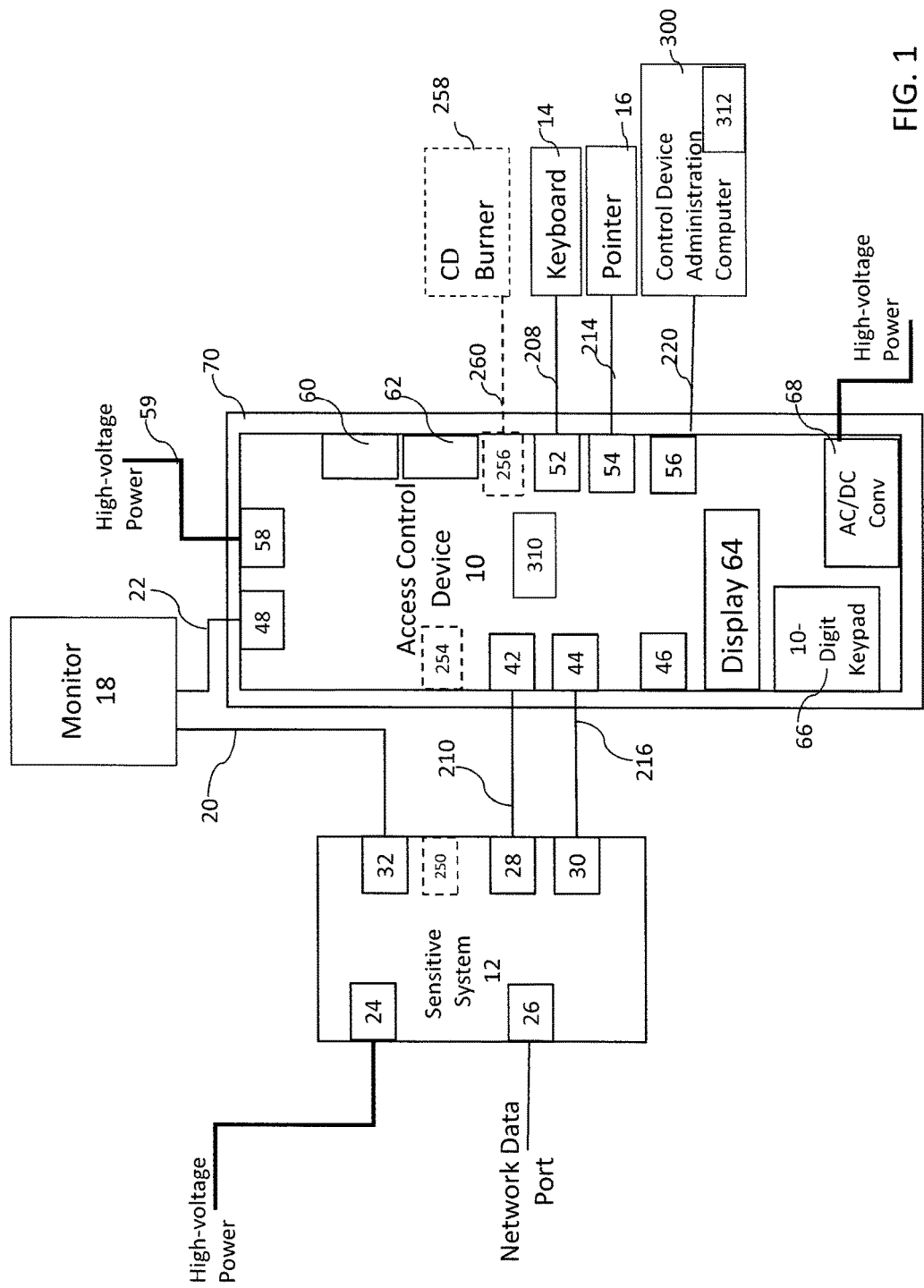
FIG. 1 illustrates the access control device of the present invention along with portions of the sensitive system for which the access control device provides controlled access.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

FIG. 1 illustrates the access control device (ACD) 10 of the present invention along with the environment in which the access control device is utilized including a sensitive system 12. The sensitive system 12 may be, for example as shown in FIG. 1, a computer workstation. Power is provided to the sensitive system 12 via a high-voltage power connection 24 (for example, a 120 V AC connection). A data/network port 26 is provided for communication between sensitive system 12 and a network. The sensitive system 12 includes input/output ports 28, 30, 32 which are designed to provide connection of input/output devices. For example, input/output port 28 is designed to provide connection of a keyboard 14; input/output port 30 is designed to provide connection of a pointer/mouse 16; and input/output port 32 is designed to provide connection of a data cable 20 of a monitor 18. Monitor 18 further includes a power cable 22 which is designed for connection to high-voltage power. As will be described herein, rather than providing connection of the keyboard and pointer 14, 16 via the input/output ports 28, 30, connection of the keyboard and pointer 14, 16 are provided via the access control device 10. In addition, rather than providing power to the monitor 18 via a direct connection of high-voltage power to the cable 22, a power connection to the monitor 18 is provided via the access control device 10. The access control device 10 can therefore by utilized to control access to sensitive system 12 as will be described in further detail.

The access control device (ACD) 10 includes a plurality of internal ports including an internal keyboard port 42, an internal pointer port 44, internal network port 46, and an internal monitor power port 48. The access control device further includes a plurality of external ports including an external keyboard port 52, and an external pointer port 54, an external network port 56, and an external monitor power port 58. A high-voltage power via cable 59 is provided to the external monitor power port 58. Ports 42, 44, 52, 54 may be, for example, USB ports. Ports 46, 56 may be for example, Ethernet ports. The access control device 10 includes first and second token readers 60, 62, a display 64 and keypad 66 for interaction by the user(s) with the access control device 10. Power to the access control device 10 is provided by via an AC-to-DC converter 68 receiving power from a high-voltage power source. The access control device 10 is secured within a tamper evident enclosure 70.

Figure 2:
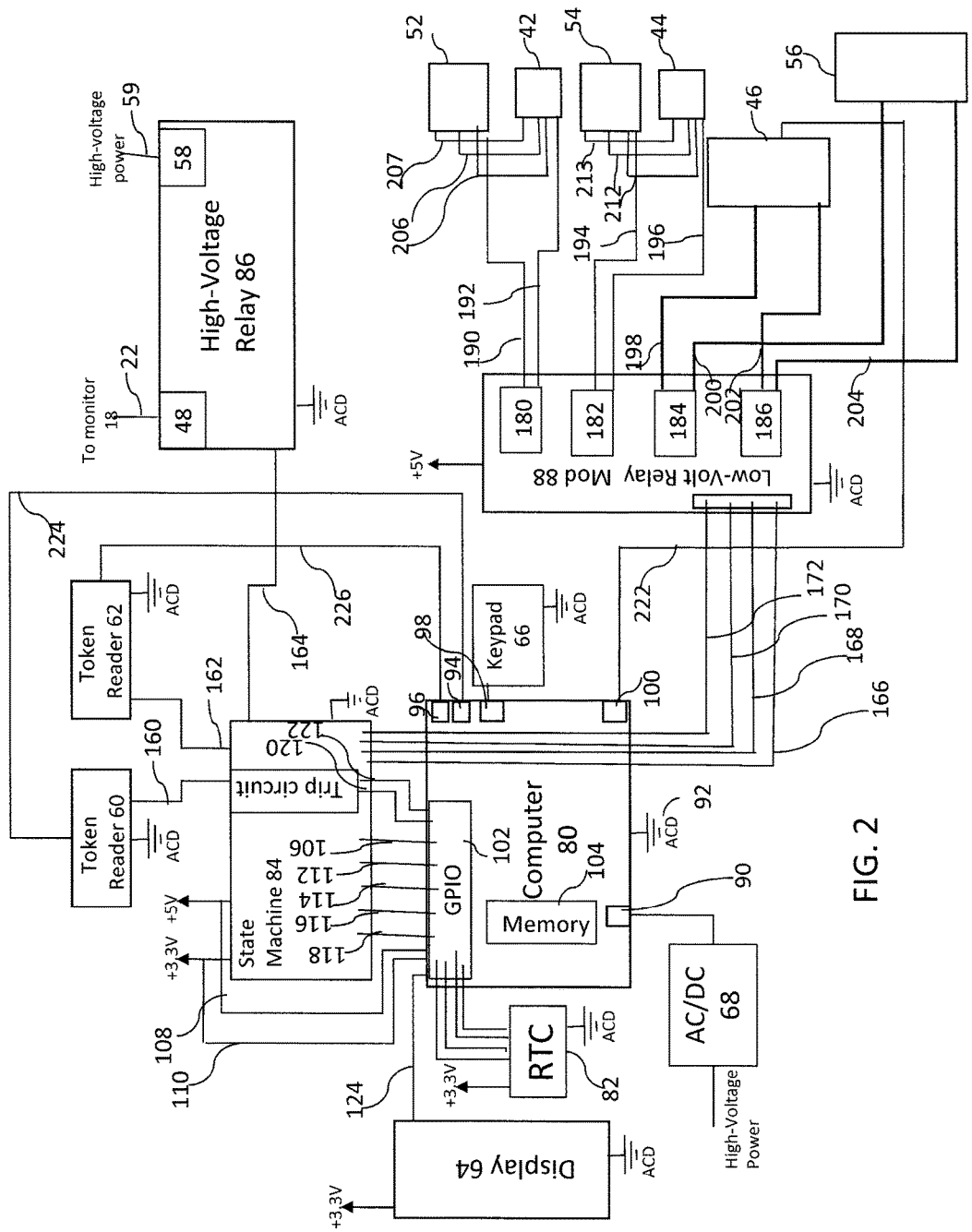
FIG. 2 illustrates a schematic overview of the access control device.

The access control device (ACD) 10 is illustrated in further detail in FIG. 2. The access control device 10 generally includes an embedded computer 80, the AC-to-DC converter 68, a clock 82, a state machine 84, the first and second token readers 60, 62, the display 64, the keypad 66, a high-voltage relay 86, a low-voltage relay module 88, the internal ports 42, 44, 46, 48 and the external ports 52, 54, 56, 58.

The embedded computer 80 may be, for example, a Raspberry Pi 2 Model B sold by the Raspberry Pi Foundation Element14. The embedded computer 80 generally includes a power connector 90; an access control device (ACD) ground connection 92, device ports 94, 96, 98 for connection of the first and second token readers 60, 62 and the keypad 66; an network port 100, general purpose input/out (GPIO) pins 102, and memory 104. The GPIO pins 102 provide signals to the state machine 84 including: ACD_Ground 106, 5V_Power 108, 3.3V_Power 110, GateSet 112, GateClear 114, SS/NetAdmin_PIN_verified 116; and ACDAdmin_PIN_Verified 118. Signals received by the GPIO pins 102 of the embedded computer80 from the state machine 84 include: Q1_Out 120 and Q2_Out 122. Signals received by GPIO pins 102 of the embedded computer from the display 64 include LCD_receive 124.

Power to the embedded computer 80 is provided by the AC-to-DC converter 68. The AC-to-DC converter 68 provides power to the embedded computer 80 and conversion of 120V/15 A AC power to 5V/2 A DC power. The embedded computer 80 provides power supply signals to be utilized by components of the control device 10. For example, the embedded computer 80 provides the 5V_power signal 108 and the 3.3V_power signal 110 to the state machine 84.

The display 64 provides connection to ACD ground and 3.3 v power. The display generates the LCD_receive signal 124 which is provided to the embedded computer 80.

The keypad 66 provides connection to ACD ground. The keypad 66 is connected to the input device port 98 of the embedded computer 80 via a,USB cable, for example. As will be described below, the keypad 66 allows users to enter personal identification numbers (PIN) for the purpose of providing authentication of the user.

The real-time clock (RTC)/clock 82 includes a connection to ACD ground and 3.3V power. The clock 82 further provides a serial peripheral interface clock (SPI_CLK) signal 126, a master-in slave-out (MISO) signal 128, a master-out slave-in (MOSI) signal 130, and a serial peripheral interface selection signal (SPI_SEL) 132 to the embedded computer 80.

The state machine 84 utilizes minimal resources and keeps track of the states of the token readers 60, 62 and the state of the embedded computer 80 for the purpose of controlling the relays of the low-voltage relay module 88 and the high-voltage relay 86. The state machine 84 may be provided by a CPLD or by a PCB and an FPGA for example. More specifically, the state machine 84 may be provided by a CMOD (such as, for example, a CMOD S6, sold by Digilent) in combination with an FPGA (such as for example, a Spartan-6 FPGA, sold by Digilent).

Figure 3:
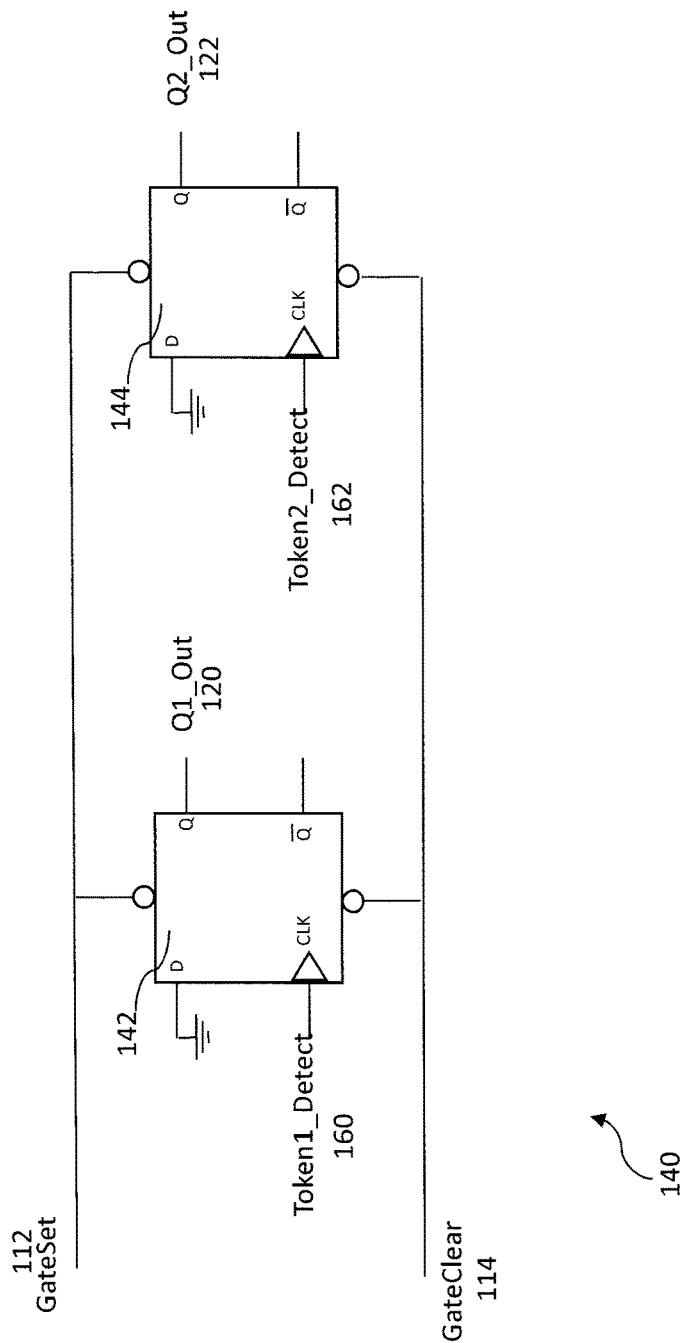
FIG. 3 illustrates a trip circuit of the a state machine provided by the access control device.

The state machine 84 provides a connection to ACD ground, 3.3 v power supply 110, and the 5 v power supply 108. The state machine 84 further includes a trip circuit 140. The trip circuit 140 is illustrated in greater detail in FIG. 3. As illustrated in FIG. 3, the trip circuit 140 includes a first flip-flop 142 and a second flip-flop 144. The GateSet and GateClear signals 112, 114 are provided to the first and second flip-flops 142, 144. The first flip-flop 142 receives a token1_detect signal 160 from the first token reader 60 and provides the Q1_out signal 122. The second flip-flop 144 receives a token2_detect signal 162 from the second token reader 62 and provides the Q2_out signal 124. As will be described below, the Q1_out and Q2_out signals 122, 124 of the trip circuit 140 provide instantaneous detection of the receipt of a security token by the first and second token readers 60, 62 or removal of a the security token from the token readers 60, 62. The state machine 84 further provides a high_voltage_enable signal 164 to the high-voltage relay 86 and keyboard_enable, pointer_enable, receive_enable, and transmit_enable signals 166, 168, 170, 172 to the low-voltage relay module 88.

The low-voltage relay module 88 provides a connection to ACD ground and 5 v power. The low-voltage relay module 88 includes a first relay 180, a second relay 182, a receive relay 184 and a transmit relay 186. The first relay 180 is connected to the external keyboard port 52 via an external-power connection 190 and to the internal keyboard port 42 via an internal-power connection 192. The second relay 182 is connected to the external pointer port 54 via an external-power connection 194 and to the internal pointer port 44 via an internal-power connection 196. The receive relay 184 is connected to the internal network port 46 via an internal-power-receive connection 198 and to the external network port 56 via an external-power-receive connection 200. The transmit relay 186 is connected to the internal network port 46 via an internal-power-transmit connection 202 and to the external network port 56 via an external-power-transmit connection 204. The relay module 88 may be, for example, a 4-channel relay module such as a SAINSmart 4-channel relay module providing four mechanical switches.

The external keyboard port 52 is linked to the internal keyboard port 42 via keyboard link connections 206 and via a keyboard ground connection 207. The external keyboard port 52 provides connection of the sensitive workstation keyboard 14 to the access control device 10 via an external keyboard cable 208 (See, FIG. 1). The internal keyboard port 42 receives an internal keyboard cable 210 (See FIG. 1) to provide a connection between the internal keyboard port 42 and the keyboard port 28 of the sensitive system 12. The keyboard cables 208, 210 may be, for example USB-type cables.

The external pointer port 54 is linked to the internal pointer port 44 via pointer link connections 212 and via pointer ground connection 213. The external pointer port 54 provides connection of the sensitive workstation pointer 16 to the access control device 10 via an external pointer cable 214 (See FIG. 1). The internal pointer port 44 receives an internal pointer cable 216 (See FIG. 1) to provide connection between the internal pointer port 44 and the pointer port 30 of the sensitive system 12. The pointer cables 214, 216 may be, for example USB-type cables.

The external network port 56 is linked to the internal network port 46 via network link connections (not shown). The external network port 56 provides connection of a control device administration computer 300 to the access control device 10 via an external communication cable 220 (See FIG. 1). The internal network port 46 receives an internal communication cable 222 to provide connection between the internal network port 46 and the network port 100 of the embedded computer 80. The external and internal communication cables 220, 222 may be, for example, CAT5 type cables.

The first and second token readers 60, 62 each provide a connection to ACD ground and the 3.3V power supply. The token readers 60, 62 may be for example, smart card readers. The first token reader 60 is in communication with the embedded computer 80 via the device port 94 and a first token reader cable 224. The second token reader is in communication with the embedded computer via the device port 96 and a second token reader cable 226. The first token reader 60 provides the Token1_detect signal 160 to the state machine 84 and the second token reader 62 provides the Token2_detect signal 162 to the state machine 84.

The high-voltage relay 86 provides a connection to ACD ground. The high-voltage relay 86 may be, for example, a PowerSwitch Tail. The high-voltage relay 86 provides a relayed connection between the internal monitor power port 48 and the external monitor power port 58. The high-voltage relay 86 receives the high_voltage_enable signal 164 from the state machine 84.

The tamper evident enclosure 70 (see FIG. 1) surrounds the access control device 10. Prior to placing the access control device 10 in the tamper evident enclosure 70 proper connections must be made including: connection of the data cable 20 of the monitor 18 to the monitor data port 32 of the sensitive system 12; connection of the keyboard port 28 of the sensitive system 12 to the internal keyboard port 42 of the access control device 10 via cable 210; connection of the pointer port 30 of the sensitive system 12 to the internal pointer port 44 of the access control device 10 via cable 216; connection of the a high voltage power cable 22 to the internal monitor power port 48 of the access control device; connection of the keyboard 14 to the external keyboard port 52 of the access control device via the external keyboard cable 208; connection of the pointer 16 to the external pointer port 54 of the access control device via the external pointer cable 214; connection of the high-voltage power to the external monitor power port 58 of the access control device via power cable 59; and connection of the AC-to-DC converter 68 to high voltage power. Once the appropriate connections have been made, the access control device 10 is placed in the tamper evident enclosure 70 to restrict access to ports 42, 44, 46, 48. In addition, the internal connections between the access control device 10 and the sensitive system 12 may be further secured by applying cable locks to the cables at the ports 28, 30, 32. When access control device 10 is secured within the tamper evident enclosure 70, access is provided to token readers 60, 62 and network port 56.

When power is initially provided to access control device 10, the access control device is initialized. For example, upon initialization, the SS/NetAdmin_PIN_verified pin is set to OFF, the ACDAdmin pin is set to OFF, the GateSet pin is set to OFF, the GateClear pin is set to ON, the Q1_Out is sent to 0 and the Q2_Out is set to 0.

Access to the sensitive system 12 or the access control device 10 by users is provided upon authorization. As illustrated in FIGS. 5A-D, the authorization process includes group membership confirmation and authentication. Account information for each user to be granted access to the sensitive system 12 or the access control device 10 is provided in a member database stored in the memory 104 of the embedded computer 80 of the access control device 10. This account information is created on the control device administration computer 300 and then transferred to the memory 104 of the access control device 10. Account information for each user includes information retrieved from the user's token using a token reader. The user information obtained from the token reader includes, for example, the user's name and the user's public-key. Additional information may be assigned to the user account. For example, each user may be assigned to a group and the status of the user account may be identified as "active' or "inactive".

A user's group assignment will determine the extent of access the user will be granted to the sensitive system 12 and/or the access control device 10. The invention provides three user groups which may be assigned to a user: sensitive system users, access control device (ACD) administrators and network administrators. Sensitive system users include individuals who, together with one or more other sensitive system users, are authorized to access and/or use the sensitive system 12. ACD administrators include individuals authorized to create and manage control device accounts and who are authorized to audit usage of the access control device 10. Network administrators include individuals authorized to manage the network to which the sensitive system 12 is connected but who are not authorized to access or use the sensitive system 12.

Figure 4A:
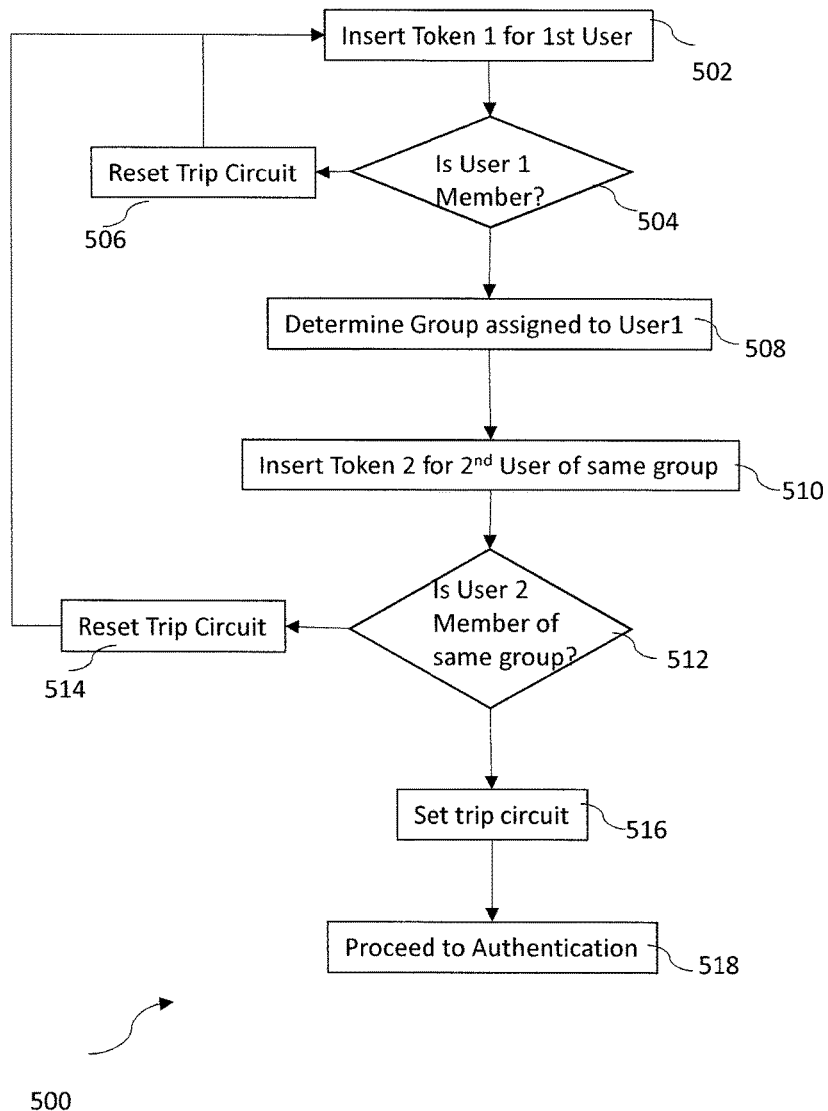
FIGS. 4A-4D illustrate an authorization process provided by the present invention.

As illustrated in FIG. 4A, the group membership process 500 begins at step 502 by displaying a message on display 64 to prompt a user to insert a token in the first token reader 60. Upon receipt of a token by the token reader 60, a token1_detect signal 160 is provided to the state machine 84. In response, to the token1_detect signal 160, at step 504 the embedded computer 80 determines whether an active account associated with the first user is provided in the member database. If an active account is not provided in the member database for the first user, at step 506 the display 64 will provide a message indicating that the first user is not authorized (e.g., "[NAME] Not Authorized"); a log is created and stored in the memory 104 to record the name of the user; a strobe (e.g. Off→ON→OFF) is provided to Gate-Clear to reset the trip circuit 140 to ensure that Q1_out is OFF and Q2_Out is Off; and the authorization process begins again. If an active account is provided in the database for the first user, at step 508 the first user's group membership is determined and the display 64 will prompt a second user of the same group to insert a token in the second token reader 62. Upon insertion of a token in the second token reader 62 at step 510, a token2_detect signal 162 is provided to the state machine 84. In response, to the token2_detect signal 162, at step 512 the embedded computer 80 determines whether an account associated with the second user is provided in the member database. If an active account is not provided in the member data base for the second user, at step 514 the display 64 will provide a message indicating that the second user is not authorized (e.g., "[NAME] Not Authorized"); a log is created and stored in the memory 104 to record the name of the user; a strobe (e.g. OFF→ON→OFF) is provided to GateClear to reset the trip circuit 140; and the authorization process begins again. If an active account is provided in the member database for the second user and if the second user is assigned to the same group to which the first member is assigned, at step 516 a strobe signal (e.g., OFF→ON→OFF) is provided to the GateSet pin 112 of the state machine 84 to set the trip circuit 140. In response to the strobe signal, the state machine sets Q1-out ON and sets Q2-out ON, to complete the group membership confirmation process.

As illustrated at step 518, once group membership confirmation is completed, each member of the pair must be authenticated. As noted above, group membership confirmation requires that the first and second users are assigned to the same group. The authentication process will vary depending upon the group membership of the pair of user.

Figure 4B:
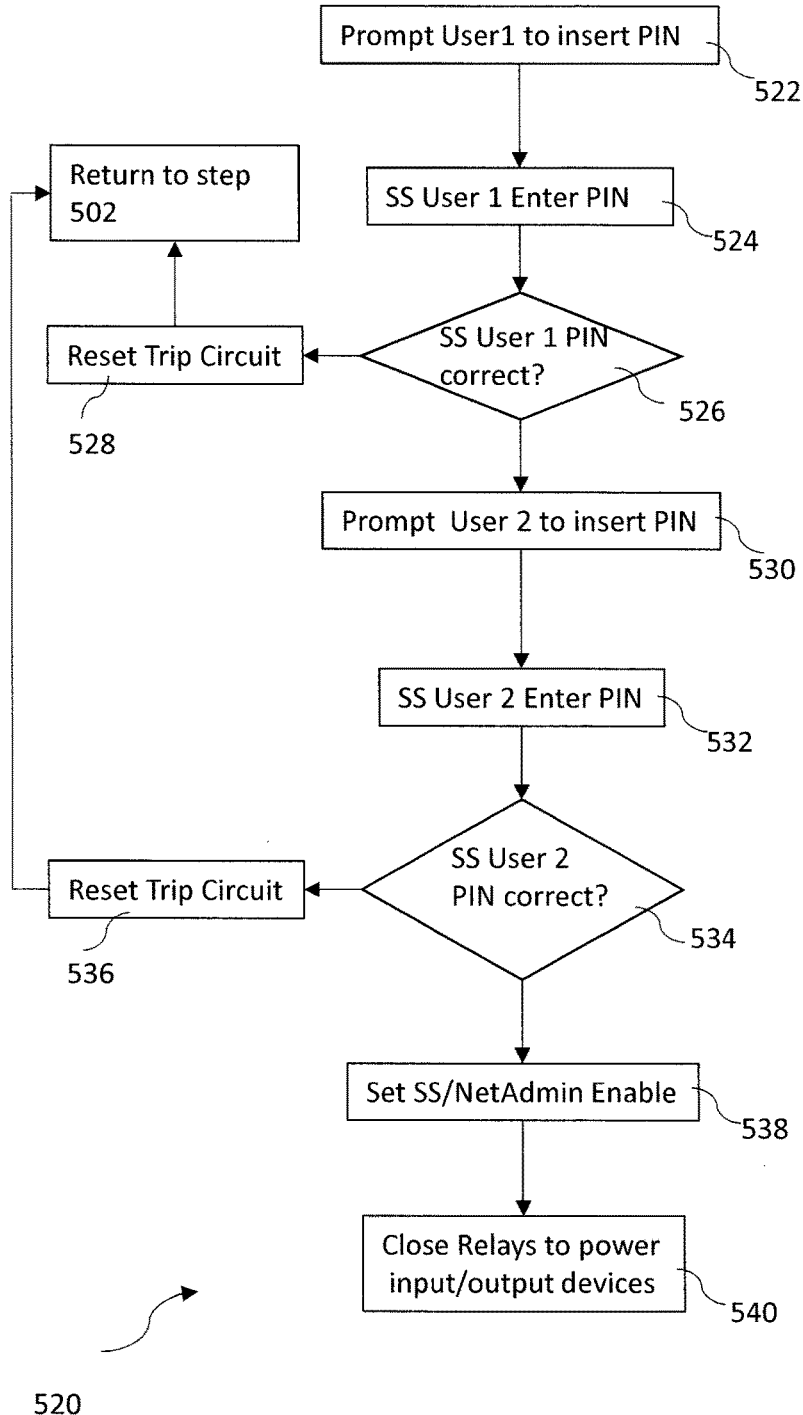

The authentication process for sensitive system users is illustrated in FIG. 4B and begins at step 522 by prompting the first sensitive system user to insert a PIN. In response, the embedded computer 80 provides a first randomly generated nonce. Utilizing the public key associated with the first sensitive system user's token, the embedded computer 80 encrypts the nonce, and provides the encrypted nonce and the first sensitive system user's PIN entered at step 524 to the token reader 60. The token reader 60 returns a decrypted challenge response to the embedded computer 80 and at step 526 it is determined whether the correct PIN was entered by determining if the value of the decrypted challenge response matches the randomly generated nonce. If the correct PIN was not entered, at step 528 the display 64 will provide a message indicating that the second user is not authorized (e.g., "[NAME] Not Authorized"); a log is created and stored in the memory 104 to record the failed authorization attempt; a strobe (e.g. OFF→ON→OFF) is provided to GateClear to reset the trip circuit 140 at step 528; and the authorization process begins again at step 502. If the correct PIN was entered and the value of the decrypted challenge response matches the randomly generated nonce, authentication of the first sensitive system user is achieved and at step 530 the second sensitive system user is prompted to enter a pin. In response, the embedded computer 80 provides a second randomly generated nonce. Utilizing the public key associated with the second sensitive system user's token, the embedded computer 80 encrypts the second nonce, and provides the encrypted nonce and the second sensitive system user's PIN entered at step 532 to the token reader 62. The token reader 62 returns a decrypted challenge response to the embedded computer 80 and at step 534 it is determined whether the correct PIN was entered by determining if the value of the decrypted challenge response matches the randomly generated nonce. If the correct PIN was not entered, at step 536 the display 64 will provide a message indicating that the second user is not authorized (e.g., "[NAME] Not Authorized"); a log is created and stored in the memory 104 to record the failed authorization attempt; at step 536 a strobe (e.g. OFF→ON→OFF) is provided to GateClear to reset the trip circuit 140; and the authorization process begins again at step 502. If the value of the decrypted challenge response matches the randomly generated second nonce, authentication of the second sensitive system user is achieved and the sensitive system user authentication process in completed. Upon completion of the sensitive system user authentication process, the authorization process is complete and at step 538 the SS/NetAdmin_Pin Verfied 116 is turned ON.

At step 540, in response to turning ON the SS/NetAdmin_Pin Verfied 116, the state machine 80 provides the keyboard enable signal 166 and the pointer enable signal 168 to the relay module 88. In response to the keyboard enable signal 166, the first relay 180 is closed and power is provided to the internal keyboard port 42 and the external keyboard port 52 via the external-power connection 190 and the internal-power connection 192 to provide power to the keyboard 14 thereby enabling use of the keyboard 14. In addition, the keyboard link connections 206 provide for communication of key strokes between the keyboard 14 and the sensitive system 12. In response to the pointer enable signal 168, the second relay 182 is closed and power is provided to the internal pointer port 44 and the external pointer port 54 via the external-power connection 194 and the internal-power connection 196 to provide power to the pointer 16 thereby enabling use of the pointer 16. In addition, the pointer link connections 212 provide for communication of pointer control between the pointer 16 and the sensitive system 12.

In addition to providing the keyboard enable and pointer enable signals 166, 168 to the low-voltage relay module 86, in response to turning ON the SS/NetAdmin_Pin Verfied 116, the high_voltage_enable signal 164 is provided to the high-voltage relay 86 to close the high-voltage relay 86. Upon closing the relay 86, power is provided to the monitor 18 via the external monitor power port 58, the internal monitor power port 48 and the associated power cables 22, 59. With power provided to the monitor 18 via the power cable 22 and video signals provided to the monitor 18 via the data cable 20, the user is able to view and utilize the information displayed on the monitor 18. With power to the keyboard and pointer 14, 16 provided via the low-voltage relay module 86 and power to the monitor 18 provided via the high-voltage relay 86, the sensitive system user pair is able to operate the sensitive computer system 12.

Figure 4C:
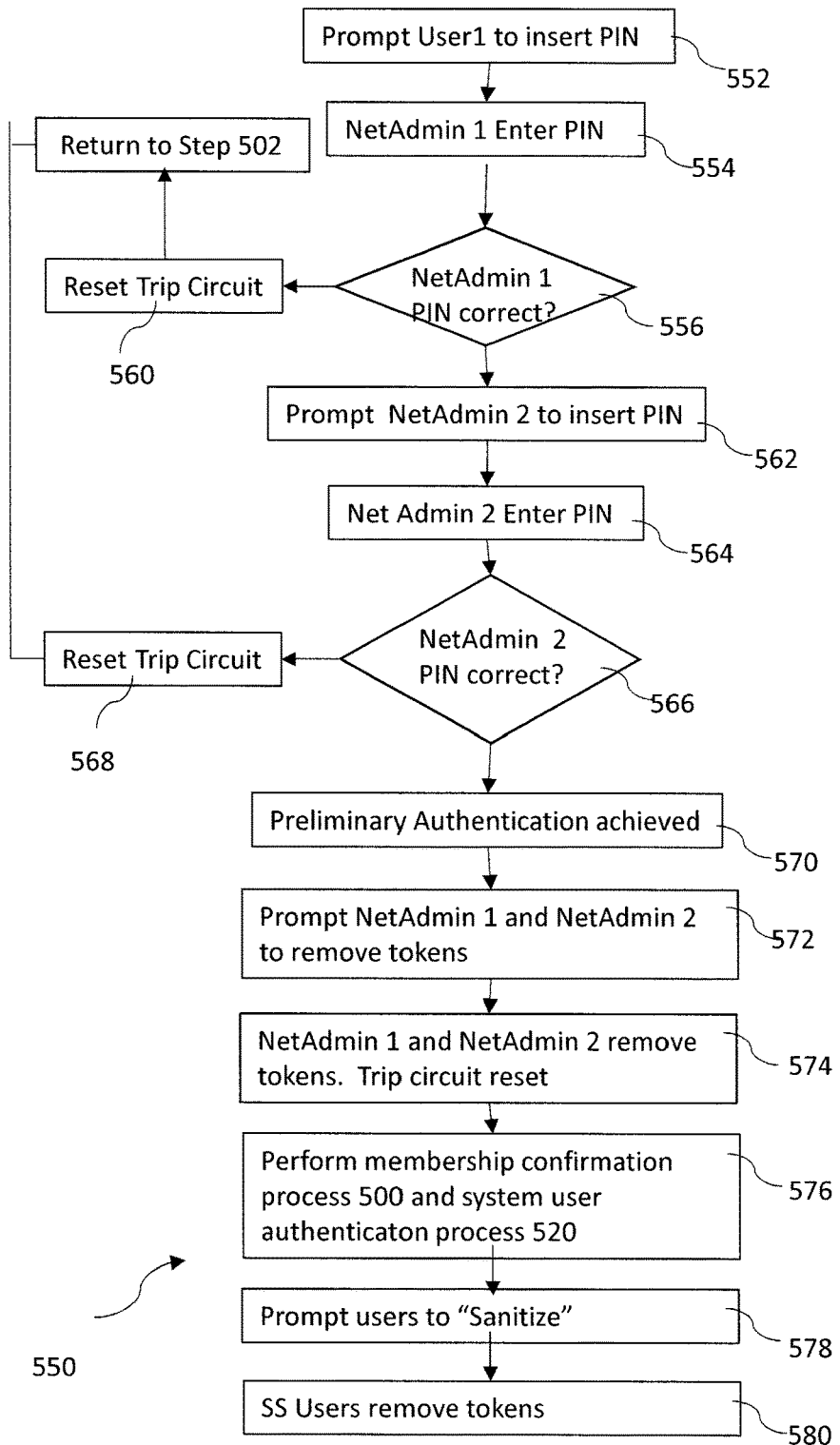

As noted above, the membership confirmation provides that the trip circuit 140 is set. If either token is removed from the token readers 60, 62 removal of the token will trigger the trip circuit. For example, if token 1 is removed, the token1_detect signal is removed from flip-flop 142, causing the Q1_Out to drop from 1 to 0 and as a result the state machine 80 removes the keyboard enable signal 166 and the pointer enable signal 168 to the relay module 88, relays 180, 182 are opened and power to the keyboard 14 and mouse 16 is withdrawn. In addition, the high_voltage_enable signal 164 is withdrawn from the high-voltage relay 86, relay 86 is opened and power to the monitor 18 is withdrawn As noted above, the group assigned to a member is determined during the group membership confirmation process 500 and the authentication process varies for each group of users. If the pair of user for which group membership has been confirmed is a pair of network administrators, the authentication process for network administrators is initiated. As illustrated in FIG. 4C the authentication process of network administrators 550 begins by prompting the first network administrator to insert a PIN at step 552. In response, the embedded computer 80 provides a first randomly generated nonce. Utilizing the public key associated with the first network administrator's token, the embedded computer 80 encrypts the nonce, and provides the encrypted nonce and the first network administrator's PIN (entered at step 554) to the token reader 60. The token reader 60 returns a decrypted challenge response to the embedded computer 80 and at step 556 it is determined whether the correct PIN was entered by determining if the value of the decrypted challenge matches the randomly generated nonce. If the correct PIN was not entered, the display 64 will provide a message indicating that the second user is not authorized (e.g., "[NAME] Not Authorized"); a log is created and stored in the memory 104 to record the failed authorization attempt; a strobe (e.g. OFF→ON→OFF) is provided to GateClear to reset the trip circuit 140 at step 560; and the authorization process begins again at step 502. If correct PIN was entered and the value of the decrypted challenge response matches the randomly generated nonce, authentication of the first network administrator is achieved and at step 562 the second network administrator is prompted to enter a pin. In response, the embedded computer 80 provides a second randomly generated nonce. Utilizing the public key associated with the second network administrator's token, the embedded computer 80 encrypts the second nonce, and provides the encrypted nonce and the second network administrator's PIN (entered at step 564) to the token reader 62. The token reader 62 returns a decrypted challenge response to the embedded computer 80 and at step 566 it is determined whether the correct PIN was entered by determining if the value of the decrypted challenge response matches the randomly generated nonce. If the correct PIN was not entered, the display 64 will provide a message indicating that the second user is not authorized (e.g., "[NAME] Not Authorized"); a log is created and stored in the memory 104 to record the failed authorization attempt; a strobe (e.g. OFF→ON→OFF) is provided to GateClear to reset the trip circuit 140 at step 568; and the authorization process begins again. If the correct PIN was entered and the value of the decrypted challenge response matches the randomly generated second nonce, authentication of the second network administrator is achieved and preliminary authentication of the network administrator user pair is provided at step 570.

As noted above, a network administrator is not permitted access to information and processes of the sensitive computer system 12, thus the sensitive system 12 must be "sanitized" before the network administrator is provided administrative access to the computer system 12. Sanitization is provided to ensure that sensitive operations are not running on the system and that sensitive information is not available. Upon preliminary authentication of the network administrator user pair, at step 572 the embedded computer 80 prompts the first and second network administrators to remove their tokens. Upon removal of the either of the network administrator tokens, Q1_Out and Q2_out are set to 0, and a strobe signal is sent to GateClear to reset the trip circuit 140 and an authorization process is initiated for sensitive system users.

Once the network administrators have removed their tokens at step 574, the process continues to step 576 where the group membership confirmation process 500 and authentication process 520 described above is performed for a pair of sensitive system users. Upon authentication of the sensitive system user pair, the SS/NetAdmin Pin Verfied 116 is turned ON and at step 578 the display 64 prompts the sensitive system users to "sanitize" the sensitive computer 12 (e.g., "[User1][User2] Sanitize") and. With the SS/NetAdmin_Pin Verfied 116 ON, the keyboard and pointer enable signals 166, 168 are provided to the relay module 88 to close the relays 180, 182 and power is provided to the keyboard 14 and pointer 16. In addition, the high_voltage_enable signal 164 is provided to the high-voltage relay 86 to close the high-voltage relay 86, providing power to the monitor 18. With the keyboard 14, pointer 16 and monitor 18 enabled, the sensitive computer system 12 may be sanitized by the sensitive system users. Once sensitive process on the sensitive system have been completed/terminated, the sensitive system users will logout of the sensitive system and the sensitive system will be deemed "sanitized". At step 580, the sensitive system users remove their tokens. Upon removal of the sensitive system user tokens from the token readers 60, 62 the token1_detect and token2_detect signals will be removed from the trip circuit, triggering the trip circuit. As a result the Q1_Out or Q2_Out drop from 1 to 0 removes the keyboard enable signal 166 and the pointer enable signal 168 to the relay module 88, relays 180, 182 are opened and power to the keyboard 14 and mouse 16 is withdrawn. In addition, the high_voltage_enable signal 164 is withdrawn from the high-voltage relay 86, relay 86 is opened and power to the monitor 18 is withdrawn.

At step 582, the network administrators are then prompted to reinsert their tokens. At step 584 it is determined whether the first and second network administrator tokens match the first and second network administrator tokens which initiated the authorization process. If the network administrator tokens do not match at step 586 the trip circuit 140 is reset and the authorization process returns to step 502. If the network administrator tokens match, at step 590 steps 502-516 of the group membership confirmation process are repeated to re-confirm group membership of the network administrators. Upon setting the trip circuit at step 516, a strobe signal (e.g., OFF→ON→OFF) is provided to the GateSet pin 112 of the state machine 84, setting Q1-out ON and Q2-out ON to set the trip circuit 140 and the network administrator membership confirmation process and the process returns to step 592.

At step 592, steps 552-566 are repeated to re-authenticate the network administrators. The first network administrator is prompted to enter a PIN. Upon authentication of the first network administrator, the second network administrator is prompted to enter a PIN. If at step 566 the second network administrator is authenticated, process returns to step 594 where SS/NetAdmin_Pin Verfied 116 is turned ON and as a result at step 596 high-voltage_enable, keyboard enable, and pointer enable signals 164, 166, 168 are provided to the relays 86, 180, 182 providing power to the monitor 18, keyboard 14, and pointer 16 thereby allowing the network administrators to perform network administration activities.

Figure 4D:
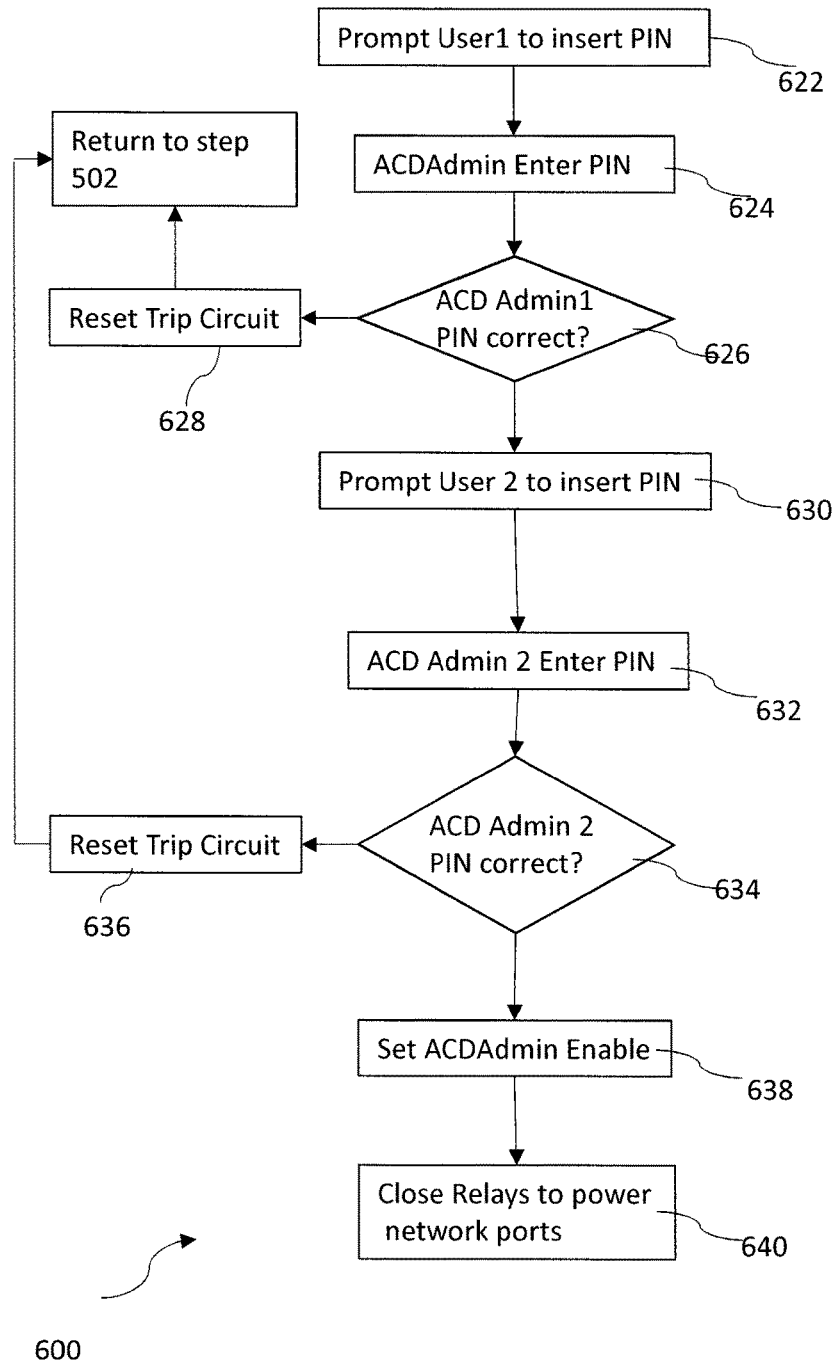

As noted above, the group assigned to a member is determined during the group membership confirmation process 500 and the authentication process varies for each group of users. If the pair of user for which group membership confirmation has been made is a pair of access control device (ACD) administrators, the authentication process 600 s initiated. As illustrated in FIG. 4D the authentication process for ACD administrators begins at step 622 by prompting the first ACD administrator to enter a PIN. At step 624 the ACD administrator enters a PIN and in response, the embedded computer 80 provides a first randomly generated nonce. Utilizing the public key associated with the first ACD administrator's token, the embedded computer 80 encrypts the nonce, and provides the encrypted nonce and the first ACD administrator's PIN to the token reader 60. The token reader 60 returns a decrypted challenge response to the embedded computer 80 and at step 626 it is determined whether the ACD Administrators PIN was entered correctly by determining if the value of the decrypted challenge response matches the randomly generated nonce. If the correct PIN was not entered, at step 628 the display 64 will provide a message indicating that the second user is not authorized (e.g., "[NAME] Not Authorized"); a log is created and stored in the memory 104 to record the failed authorization attempt; a strobe (e.g. OFF→ON→OFF) is provided to GateClear to reset the trip circuit 140 at step 628; and the authorization process begins again at step 502. If the correct PIN was entered and the value of the decrypted challenge response matches the randomly generated nonce, authentication of the first ACD administrator is achieved and at step 630 the second ACD administrator is prompted to enter a pin. In response, the embedded computer 80 provides a second randomly generated nonce. Utilizing the public key associated with the second ACD administrator's token, the embedded computer 80 encrypts the second nonce, and provides the encrypted nonce and the second control device administrator's PIN (provided at step 632) to the token reader 62. The token reader 62 returns a decrypted challenge response to the embedded computer 80 and at step 634 it is determined whether the PIN was entered correctly by determining if the value of the decrypted challenge response matches the randomly generated second nonce. If the correct pin was not entered at step 636, the display 64 will provide a message indicating that the second user is not authorized (e.g., "[NAME] Not Authorized"); a log is created and stored in the memory 104 to record the failed authorization attempt; at step 536 a strobe (e.g. OFF→ON→OFF) is provided to GateClear to reset the trip circuit 140; and the authorization process begins again at step 502. If the value of the decrypted challenge response matches the randomly generated second nonce, authentication of the second control device administrator is achieved and the ACD administrator authentication process in completed and at step 638 the ACD administrator authentication process, the ACDAdmin Pin 118 is turned ON.

In response to turning ON the ACDAdmin PIN 118, the state machine 84 provides the receive_enable signal 170 and transmit_enable signal 172 to the relay module 88. Upon receipt of the enable signals 170, 172, at step 640 the receive and transmit relays 184, 186 of the low-voltage relay module 88 are closed and power is provided to the internal and external network ports 46, 56 via the internal-receive-power, external-receive-power, internal-transmit-power, and external-transmit-power connections 198, 200, 202, 204 and the network link connections (not shown). With power provided to the internal and external network ports 46, 56, the control device administrator is provided access to the network port 100 of the embedded computer and therefore is able to manage the access control device 10.

In addition to providing the authorization processes described above, the control device 10 provides additional security features. For example, if duplicate tokens exist and the same token is provided to the first and second token readers 60, 62, the authorization process is restarted and the attempt to utilize duplicate tokens is logged in the memory 104. In addition a strobe (e.g. OFF→ON→OFF) is provide to the GateClear pin to ensure Q1_out and Q2_out are both set to OFF.

Combination logic is provided on the state machine 84 to provide an additional security feature of the ACD 10. Specifically the combination logic monitors the SS/NetAdmin pin 116 and the ACDAdmin pin 118 to ensure both pins 116, 118 are not set to ON. Because proper operation should not provide for both pins 116, 118 to be on at the same time, if ON states are detected at both pins 116, 118, the high_voltage_enable, keyboard_enable, pointer_enable, receive_enable, and transmit_enable signals 164, 166, 168, 170, 172 are set to OFF to disable all external ports 52, 54, 56, 58.

Software is utilized to facilitate use and management of the access control device 10 and enforcement of an access control device policy. As illustrated in FIG. 1, the software includes an operations module 310 and an administration module 312 provided on the device administration computer 300. The operations module 310 controls operation of the ACD device 10 as described above and facilitates use of the access control device 10 by sensitive system users and network administrators including operation of the interface provided by the display 84 and keypad 46.

Figure 5A:
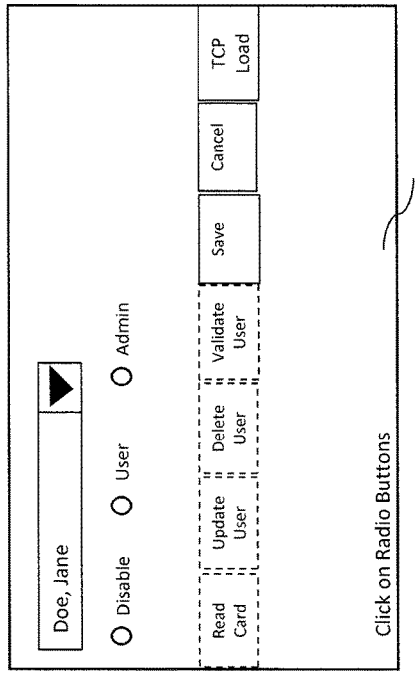
FIGS. 5A-5C illustrate portions of a user interface associated with the management of the access control device.
Figure 5B:
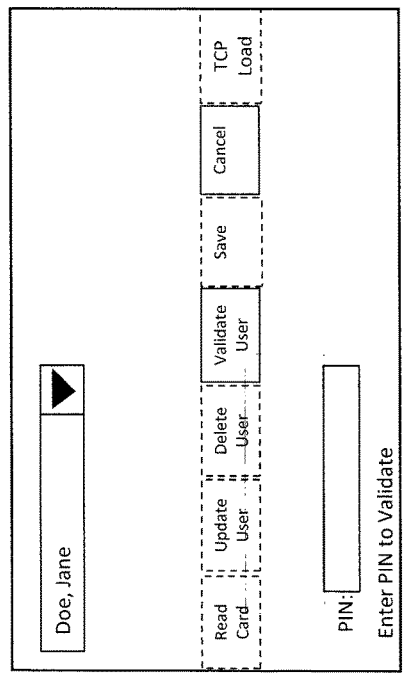
Figure 5C:
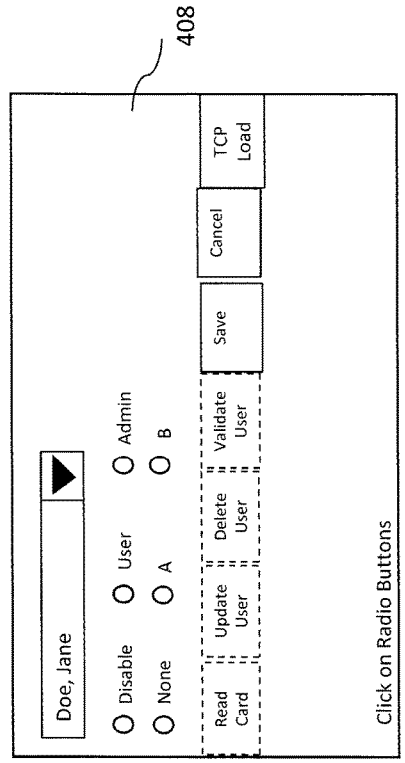

The administration module 312 facilitates administration of the access control device 10 by access device administrators. The administration module 312 provides a user interface. Portions of the user interface of the administrator module312 are illustrated in FIGS. 4A-4C. More specifically, FIGS. 4A-4C illustrate a portion of the administrator module interface displayed during the addition of a user account to the member database. To add an account a token reader is provided in communication with the control device administration computer 300, and user information is read from the user token. An administration module interface then prompts the user to enter a PIN as shown in portion 402 of the interface (FIG. 5A). Once the PIN has been entered, the ACD administrator selects the user role to be associated with the account, i.e., either sensitive system user ("User") or network administrator ("Admin") as shown in portion 404 of the interface (FIG. 5B). An option is also provided to indicate that the status of a user's account as active or disabled. After entering the account information, as illustrated in FIG. 5C, the ACD administrator is prompted to save the account information as shown in portion 408 of the interface. Upon saving the account information, a user record is stored in the member database associated with the administration computer. As discussed above, the member database is also stored in the memory 104 of the embedded computer 80 of the access control device 10. In addition to providing prompts for adding new user accounts, the interface also provides displays for facilitating updates to a user account and/or deletion of a user account.

As discussed above, the ACD administrator may also audit use of the access control device 10. As described above, the ACD administrator may connect a ACD administration computer 300 to the access control device 10. Upon authentication of a pair of ACD administrators, the ACD administrators are provided access to the access control device 10 via the external network port 56. The TPC administration module 312 of the software provides an interface allowing the ACD administrator to access information in the memory 104 to create a variety of audit reports. For example, the ACD administrator may download information identifying authorized users, identifying times and dates users accessed the system, identifying failed attempts to access the ACD device, names of users who attempted to access the system but do not hold accounts, information regarding times when tokens were removed from the token readers including the times associated with insertion and removal of the sensitive system user tokens in connection with the sanitization process, information regarding duplicate cards, information indicating and attempts to use a single token in both token readers 60, 62 in connection with a single access attempt.

The access control device 10 of the present invention provides several advantages. One advantage is that the access control device 10 provides lockout to a sensitive system when a token is removed. However, because the access control device does not directly interface with workstation, applications running on the workstation will continue to run after the token is removed. More specifically, after a process has been initiated on the sensitive computer system, a token can be removed from the token reader, preventing further control of the sensitive system while allowing the initiated processes to continue on the sensitive workstation. Control of the sensitive workstation may be regained upon authentication of a sensitive system user pair. Notably, because the authorization process is reinitiated upon the removal of a token, access to the sensitive system may be reinitiated by any pair of authorized sensitive system users, i.e., the pair of authorized users gaining access to the sensitive workstation does not need to match the pair of authorized users that initiated access and locked the workstation. Thus, if a shift change occurs after a process is initiated on the sensitive computer system, a second pair of authorized users may pick up the process wherein the first pair of authorized users left.

Another advantage is that the access control device provides logging and audit capabilities, including the ability to log each access event. If desired, these capabilities enable forensic analysis following a security incident. Auditing and account configuration of the invention is performed using a separate computer. In addition, access to the memory 104 of the access control device is limited to access control device administrators. Because sensitive system users do not have access to the network administration computer 58 or the memory 104, sensitive system users are prevented from modifying the log files to cover possible unauthorized system access.

The Access control device 10 only interfaces with the monitor, keyboard and pointer of the sensitive computer system 12 and therefore does not interface with the operating system of the sensitive computer system 12. By providing access control to the sensitive system using an access control device separate from the sensitive workstation, modifications to the existing sensitive system are avoided. Thus, the access control device is compatible with any sensitive system regardless of the operating system.

The invention reduces the administrative burden required to manage access control device user accounts. Specifically, authorized users are assigned to role-based groups and authorization of a pair of users requires the users to be members of the same group. Passwords do not need to be provided and split between each pair of users. Rather, each authorized member may be paired with another authorized member of the same group. The elimination of split password procedures eliminates administrative burden and enables simplified administration of system access.

The invention requires the presence of two authorized sensitive system users when access to the workstation is required by network administrators, preventing unauthorized access of sensitive content by the network administrators.

Although the invention has been described as providing for the authorization of a pair of users, the invention may provide for authorization of any number of users in order to provide access to the sensitive system 12 or the device 10. For example, rather than requiring authorization of a pair of users, the invention may provide for the authorization and authentication of three users, for example. In such a scenario, three token readers could be provided for receipt of each user's token.

As described, the first and second token readers 60, 62 may be for example, smart card reader connected to the embedded computer 80 via USB cables. Alternatively, the token readers 60, 62 may be provided by RFID readers. The token readers 60, 62 may be connected to the computer 80 via Bluetooth communication. Use of a token reader in combination with the authentication of the user provides two-factor authentication.

The input/output devices enabled by the present invention have been described as a monitor 18, keyboard 14 and pointer 16. Additional input/output devices may be provided. As show FIG. 1, modifications may be made to the access control device to accommodate the additional input/out device. For example, the sensitive computer system 12, may include a CD port 250 and the access control device may include internal CD port 254 and external CD port 256. A CD burner 258 connected to the access control device 10 via the external CD port 256 and a CD cable 260 may be enable via an enable_CD signal provided by the state machine 84 to close a relay associated with the internal and external CD ports 254, 256. With the relay closed, a user would be permitted to transfer information from the sensitive system 12 to CD inserted in the CD burner. To accommodate additional input/output devices, additional relays may be added to the access control device 10.

As mentioned above, access to a variety of sensitive systems may be provided by the access control device 10. For example, the access control device may be utilized in connection with a KVM switch. Often a plurality of servers are mounted in a server rack and a keyboard, monitor and mouse are not provided to control the server. Rather the plurality of servers are associated with a KVM switch and a single keyboard, monitor and pointer are associated with the KVM switch. Utilizing the KVM switch, the user may then select the server to be controlled by the keyboard, monitor and pointer. By treating the KVM switch as a sensitive system 12, access to servers in the server rack may be controlled.

While preferred embodiments of the present invention are shown and described, it is envisioned that those skilled in the art may devise various modifications of the present invention without departing from the spirit and scope of the appended claims.

The invention claimed is:

1. A multi-user access control device for controlling access, by multiple users having access tokens, to a sensitive system including an input/output device, said multi-user access control device including:
   an embedded computer;
   a state machine in communication with said embedded computer,
   a first token reader in communication with said state machine and said embedded computer for receiving a first token from a first user;
   a second token reader in communication with said state machine and said embedded computer for receiving a second token from a second user;
   a relay in communication with said state machine,
   an internal port in communication with said sensitive system and providing an internal power connection to said relay, an external port in communication with said input/output device and providing an external power connection to said relay;
wherein upon authorization of said first and second users, an enable signal is provided by said state machine to said relay and said relay is closed to provide power to said input/output device.

2. The device of claim 1, wherein said relay is a low-power relay.

3. The device of claim 2, wherein said input/output device is a keyboard.

4. The device of claim 2, wherein said input/output device is a CD burner.

5. The device of claim 1, wherein said relay is a high-power relay.

6. The device of claim 5, wherein said input/output device is a monitor.

7. The device of claim 6, further including a video data connection between said sensitive system and said monitor.

8. The device of claim 1, wherein said state machine further includes a trip circuit.

9. The device of claim 7, wherein authorization of said first and second users is provided upon group membership confirmation and authentication of said first and second users.

10. The device of claim 9, wherein said trip circuit is set upon group membership confirmation.

11. The device of claim 9, wherein upon removal of a token, said trip circuit is triggered reinitiating authorization of said first and second users.

12. The device of claim 9, wherein said enable signal is provided upon authentication of said first and second users.

13. The device of claim 1, further including:
a receive relay;
a transmit relay;
an internal network port in communication with a network port of said embedded computer, said internal network port having an internal-receive-power connection in communication with said receive relay and an internal-transmit-power connection in communication with said transmit relay;
an external network port; having an external-receive-power connection in communication with said receive relay and an external-transmit-power connection in communication with said transmit relay;
wherein upon receipt of an enable signal at said receive relay, said receive relay is closed providing power to said internal network port and said external network port enabling receive signals to be communicated from said network port of said embedded computer to said external network port; and
wherein upon receipt of an enable signal at said transmit relay, said transmit relay is closed providing power to said internal network port and said external network port, enabling transmit signals to be communicated from said network port of said embedded computer to said external network port.

14. The device of claim 11, wherein a memory of said embedded computer includes log information and access to said log information is provided via said external network port.

* * * * *